Patented Apr. 12, 1927.

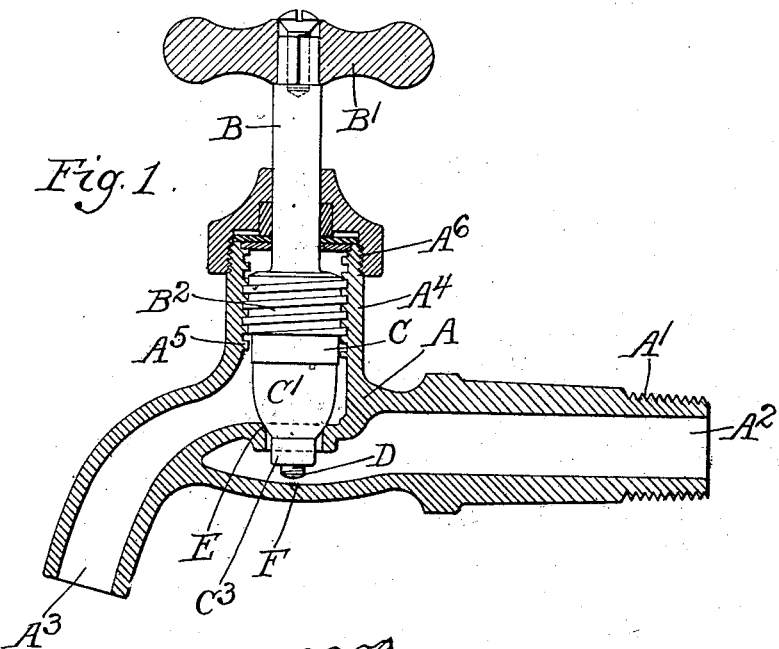
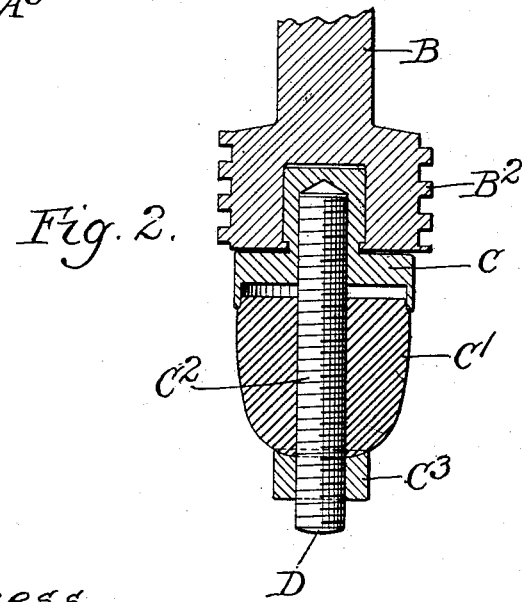

1,624,186

UNITED STATES PATENT OFFICE.

JOHN J. RYAN, OF CHICAGO, ILLINOIS.

VALVE.

Application filed February 14, 1921. Serial No. 444,719.

This invention relates to faucets and particularly to valve construction for the same.

One of the common types of valves which has heretofore been used in connection with house-hold plumbing embodies a rubber ball which is adapted to close the supply opening in the valve. This ball is ordinarily operated by means of an eccentric mounted on a rotary valve stem. The difficulty with this type has been that the eccentric mechanism is particularly liable to wear and becomes inaccurate when so worn and thus the valve cannot be completely closed. Another defect of this type of valve is that the ball is constantly in the water or other liquid which passes through the valve. This is true whether or not the valve is closed. Thus the ball is subjected to the deteriorating effect of the liquid and its life is greatly reduced.

In the structure of this invention when the valve is closed the rubber ball is not in the liquid, and only a very small part of it is touched by the liquid and the rest is above the liquid and free from its deteriorating effect. It must be borne in mind that the valve is closed by far the greater part of the time, and therefore, it is only occasionally that the rubber ball is subjected to the action of the liquid.

Another type of valve is one wherein a raised seat is provided and a screw plunger is fixed on the valve stem adapted to be screwed down upon the valve seat. The particular defect inherent in this type of valve is that the raised valve seat is worn away both by contact with the plunger and by the action of the water passing over it. Thus when the plunger is screwed down against the valve seat it does not satisfactorily close. Therefore, in order to remove such defect it is necessary to grind the valve seat down. This is a process which calls for special tools and can be repeated only a very few times after which the entire valve structure must be replaced. It is one object of the present invention to produce a valve structure which avoids the defects of the two valve types above mentioned. Other objects will appear from time to time throughout the specification and claims.

The invention is illustrated more or less diagrammatically in the accompanying drawings, wherein—

Fig. 1 is a vertical section of the valve assembly;

Fig. 2 is a detailed vertical section on an enlarged scale of the valve.

Like parts are designated by like characters throughout.

A is a valve housing screw threaded at one end as at A'; and having the inlet passage $A^2$ and the outlet passage $A^3$. It has the upper hollow extension $A^4$ screw threaded about its interior as at $A^5$, and screw threaded about its upper exterior as at $A^6$.

B is a valve stem having the operative handle B' in its upper end and having the enlarged screw threaded portion $B^2$ at its lower end in mesh with screw threaded portion $A^5$ of the valve housing. Mounted for rotation in the lower end of the enlargement $B^2$ is the swivel plate C which has secured in its under side the elastic ball or valve closing member C' which may be of rubber or any suitable material. Screw threaded in the swivel plate C is the short screw threaded rod $C^2$ about which the elastic ball C' is mounted. $C^3$ is a nut mounted on the rod $C^2$ adapted to secure the ball in place.

The extension D on the rod $C^2$ is provided as a stop or means of limiting the downward movement of the shaft B. When the shaft B is rotated so as to cause it to move downward under action of the screw thread, the ball C' comes in contact with the valve seat E within the valve housing A. With practically the first contact the valve is closed and flow through it is stopped. In order, however, to prevent injury to the parts, which might result from closing the valve to an excessive degree, the stop is provided. In the present case it strikes the valve housing at the point F and absolutely limits further downward motion of the valve. Other stops might be provided without departing from the spirit of the present invention. For example, a stop might be provided at the upper end of the valve shaft.

I have shown an operative invention, still it will be obvious that many changes both of form, shape, and relation of parts may be made without departing materially from the spirit of my invention, and I wish therefore, that my showing be taken as in a sense diagrammatical.

While I have shown and described a rubber ball in position in the valve, it will be understood that I might use a ball made of any one of a variety of materials. For example, the ball might be made of leather or might be made of any yielding material.

Where in the specification and claims the word elastic has been used, it will be understood that it is intended also to include yielding substances, such as leather and the like which possibly are not elastic in the strict sense of that word.

The use and operation of this invention are as follows:

The valve is adapted to be operated by means of the rotation of the valve stem which is accomplished by the rotation of the handle at its upper end. This rotation causes the valve stem to move up or down at the will of the operator. When the valve is to be opened the stem is so rotated as to cause it to move upward. The elastic ball is thus withdrawn from contact with the valve seat and flow through the valve commences. When it is desired to close the valve it is rotated in the opposite direction and the elastic ball contacts the valve seat. The moment this contact takes place the valve is closed and further flow through it is cut off. It is not necessary for the elastic ball to be further compressed. In fact to do so is likely to injure it. It is partly to prevent such injury that the stop to limit the downward movement of the valve stem has been provided. The moment the elastic ball contacts the seat its rotation stops. Further rotation of the valve stem merely compresses the ball to a greater degree. By means of the swiveled arrangement the elastic ball is prevented from rubbing around in the valve seat and thus wear is avoided.

A certain amount of wear is inevitable and a yielding ball will in the course of time have to be replaced. The replacement operation in this valve is extremely simple. It is necessary only to shut off the water, take the valve stem out of the valve, remove the nut at the bottom of it, remove the elastic ball and put a new one in place upon the end of the valve stem. This is an operation which can be carried out by anyone and calls for no special tool, and can be done at a very small expense.

I claim:

1. In a valve, a valve seat, a stem adapted to be moved toward and away from said seat, a yielding valve closing member mounted for rotation in the inner end of said stem and adapted to be seated upon said seat, and a positive stop to limit the seating movement of said stem, said stop forming a part of and adapted to move with the valve closing member.

2. In a valve, a seat, a stem adapted to be moved toward and away from said seat, a plate swiveled in the inner end of said stem, a yielding member adapted to be seated on said seat in response to the inward movement of said stem, and a positive stop to limit the seating movement of said stem, said stop carried by said swiveled plate and said yielding member removably mounted on said stop.

3. In a valve, a narrow valve seat, a stem adapted to be moved toward and away from said seat, a yielding valve member adapted to be seated upon said seat to close said valve, and a positive stop on which the valve member is mounted, said stop being rotatably mounted in the inner end of said stem, adapted to move with said stem and to contact a portion of the interior of said valve thereby to limit the closing movement of the valve.

Signed at Chicago, county of Cook and State of Illinois, this tenth day of February, 1921.

JOHN J. RYAN.